United States Patent
Dietrich

(10) Patent No.: US 10,609,866 B2
(45) Date of Patent: Apr. 7, 2020

(54) COMBINE HEADER REEL APPARATUS FOR SUNFLOWERS

(71) Applicant: 101288550 Saskatchewan Ltd., Assiniboia (CA)

(72) Inventor: Dave Dietrich, Assiniboia (CA)

(73) Assignee: 101288550 Saskatchewan Ltd., Assiniboia (CA)

( * ) Notice: Subject to any disclaimer, the term of this patent is extended or adjusted under 35 U.S.C. 154(b) by 95 days.

(21) Appl. No.: 15/758,627

(22) PCT Filed: Sep. 8, 2016

(86) PCT No.: PCT/CA2016/051064
§ 371 (c)(1),
(2) Date: Mar. 8, 2018

(87) PCT Pub. No.: WO2017/041177
PCT Pub. Date: Mar. 16, 2017

(65) Prior Publication Data
US 2018/0249633 A1    Sep. 6, 2018

(30) Foreign Application Priority Data
Sep. 11, 2015   (CA) ...................... 2903894

(51) Int. Cl.
*A01D 57/02*   (2006.01)
*A01D 57/12*   (2006.01)
(Continued)

(52) U.S. Cl.
CPC .......... *A01D 57/12* (2013.01); *A01D 41/147* (2013.01); *A01D 47/00* (2013.01); *A01D 57/02* (2013.01); *A01D 57/22* (2013.01)

(58) Field of Classification Search
CPC ...... A01D 41/14; A01D 41/147; A01D 57/02; A01D 57/03; A01D 57/025; A01D 57/12;
(Continued)

(56) References Cited

U.S. PATENT DOCUMENTS 2,694,894 A * 11/1954 Linscheid .............. A01D 57/03
                                                                                  56/226
4,038,810 A *  8/1977 Williams ............... A01D 57/02
                                                                                  56/220
(Continued)

*Primary Examiner* — Robert E Pezzuto
(74) *Attorney, Agent, or Firm* — Craig J. Lervick; Larkin Hoffman Daly & Lindgren, Ltd.

(57) ABSTRACT

A plant pushing apparatus for mounting on a reel of a combine where the reel comprises a center shaft rotatably mounted at each end thereof to the combine header, a plurality of contact members mounted to the center shaft in a horizontal orientation radially spaced from the center shaft, and a drive operative to rotate the center shaft such that the contact members below the center shaft move in a rearward direction toward the combine header. For each contact member, a projecting shield member is adapted at an inner portion thereof for attachment to the contact member such that an outer edge of the projecting shield member is substantially horizontal and rearward of the contact member, and such that the outer edge of the projecting shield member contacts plant stalks, particularly sunflower plant stalks, and pushes the plant stalks toward the combine header ahead of the following attached contact member.

10 Claims, 4 Drawing Sheets

(51) Int. Cl.
*A01D 57/22* (2006.01)
*A01D 47/00* (2006.01)
*A01D 41/14* (2006.01)

(58) Field of Classification Search
CPC ........ A01D 57/22; A01D 75/02; A01D 47/00;
F16C 1/0864; F16C 29/02; F16C 29/001
USPC .......................... 56/220, 226, 227, 249, 364
See application file for complete search history.

(56) References Cited

U.S. PATENT DOCUMENTS

| | | | |
|---|---|---|---|
| 4,156,340 A | | 5/1979 | Colgan |
| 4,255,920 A | | 3/1981 | Janzen |
| 4,445,314 A | | 5/1984 | Gust |
| 4,589,250 A | | 5/1986 | Faul, Jr. |
| 4,751,809 A | * | 6/1988 | Fox .................. A01D 57/02 56/220 |
| 5,024,050 A | * | 6/1991 | Leidenix ............ A01D 57/02 56/220 |
| 6,502,379 B1 | | 1/2003 | Snider |
| 7,856,801 B2 | | 12/2010 | Remillard |

* cited by examiner

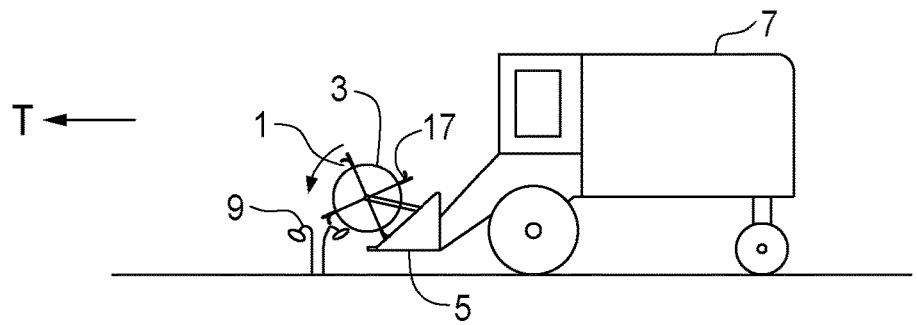
FIG. 1
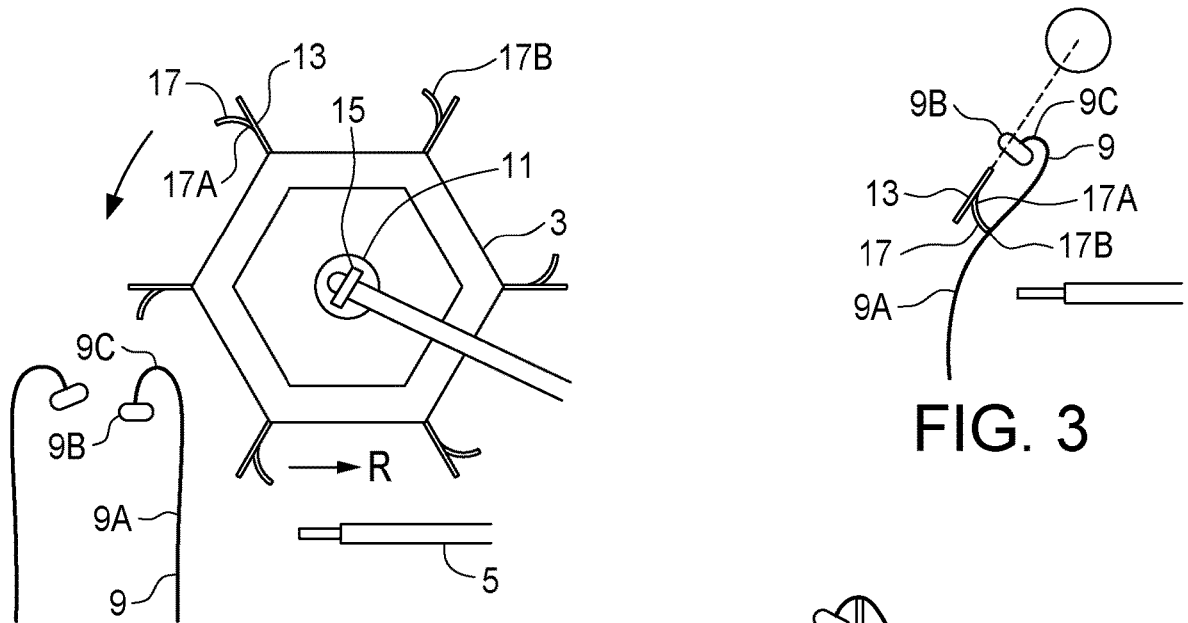
FIG. 2
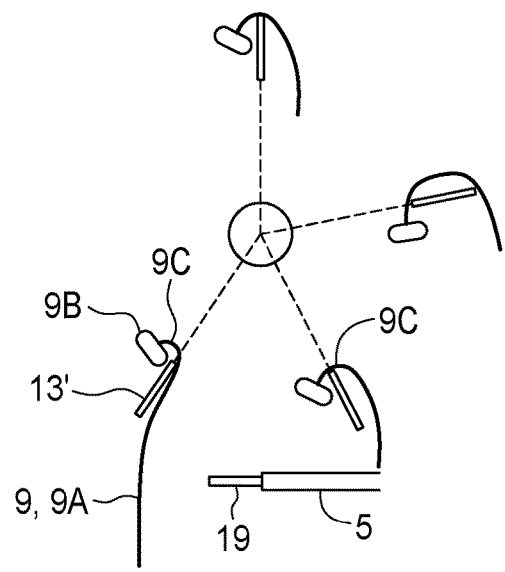
FIG. 3
FIG. 4 (PRIOR ART)

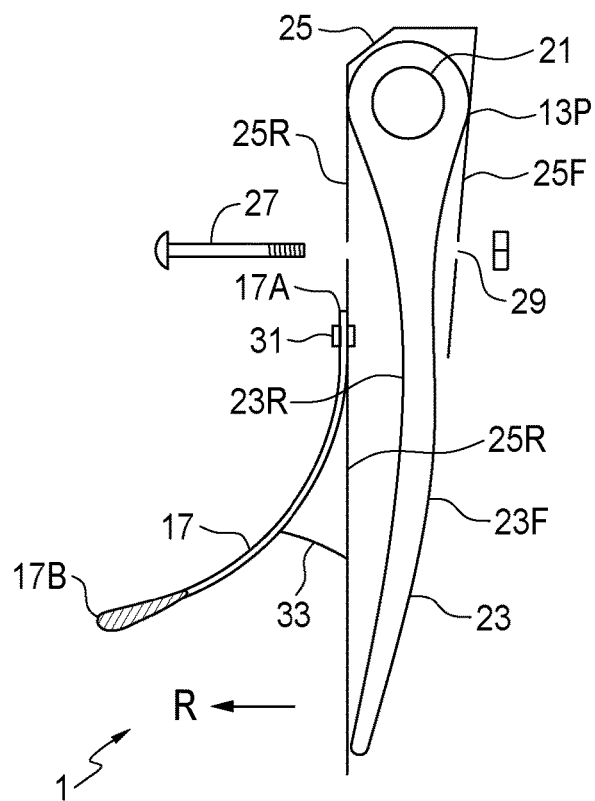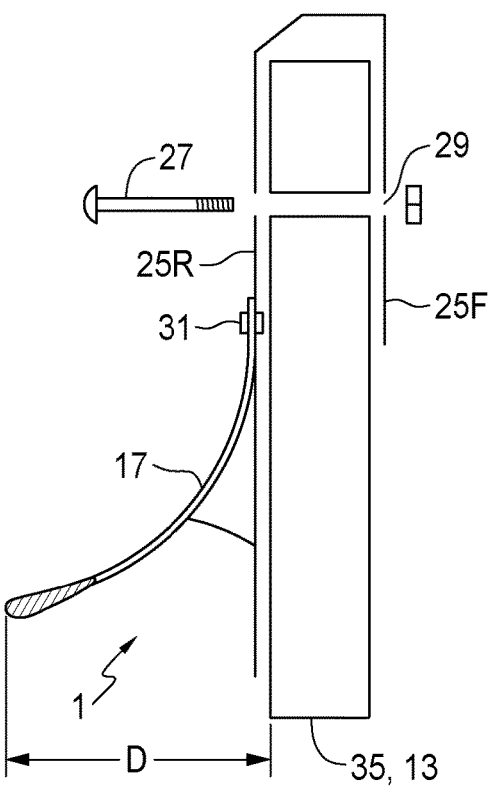
FIG. 5     FIG. 6
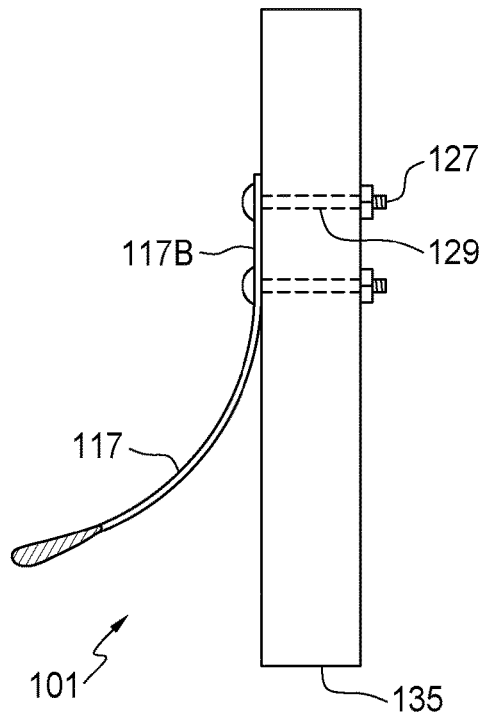
FIG. 7

COMBINE HEADER REEL APPARATUS FOR SUNFLOWERS

This disclosure relates to the field of agricultural harvesting equipment and in particular combine headers for cutting and gathering crop plants.

BACKGROUND

Harvesting sunflowers is facilitated by using specialized header arrangements on the front end of a combine to cut the stalks and gather the sunflower heads into the combine. Sunflowers grow relatively tall and the seeds are present in a head at the top of the stalk. These seed heads are relatively large and heavy, such that when the sunflower plants are mature and ready for harvesting the top of the stalks are commonly bent over with the heads hanging down and the top portion of the stalk shaped like a hook.

A typical conventional combine header reel has a rotating center shaft mounted at each end to the combine header and rotated by a reel drive. A plurality of contact members are mounted to the shaft in a horizontal orientation spaced radially from the shaft. In a typical reel, the contact members are mounted to the shaft by attaching plates or arms perpendicular to the shaft and spaced therealong extending radially from the shaft and mounting the contact members to the periphery of the plates or ends of the arms. The contact members are configured so that as the shaft and contact members rotate the contact members contact standing crop plants and move them rearward into the cutter bar and onto the header table where same are gathered into the combine.

These conventional header reels include fixed blade reels and pickup reel. In a fixed blade reel the contact members are blades that are fixed to the shaft with a face oriented substantially radially, and as the shaft rotates the faces of the blades move rearward toward the header and contact the plants as the header moves forward, pushing the plants toward the cutter bar and header table. In a pickup reel the contact members are horizontal finger tubes mounted to the shaft by mounting on the periphery of the plates, with fingers mounted to the tubes. The fingers pivot about a tube axis so the angle of the fingers varies as the reel rotates. The orientation of the fingers is dictated by a linkage so the fingers on the bottom portion of the reel always point generally downward as the reel rotates, and the fingers act to reach down and pick up crop slightly ahead of the cutter bar.

Such a pickup reel is disclosed in U.S. Pat. No. 4,156,340 to Colgan et al. and U.S. Pat. No. 6,502,379 to Snider. U.S. Pat. No. 7,856,801 to Remillard discloses a blade conversion for mounting over the fingers of a pickup reel to in light crops where the plants are spaced apart and the fingers pass through the plants instead of engaging same and sweeping them into the cutter bar. These conventional fixed blade and pickup reels are well suited to crops such as cereals, oilseeds, and pulse crops.

When harvesting sunflowers the contact members contact the stalk somewhat below the heads and sweep the stalk into the cutter bar. The stalk is cut off but often the hook of the cut off stalk hangs on the contact members with the stalk on one side and the head hanging on the other side. As the contact member moves about the rotational axis the hook of the stalk simply rotates about the contact member where it is hooked and remains hanging as the reel rotates. The head and stalk do not fall onto the header table but remain hanging on the blade/bar, tangling with further stalks as the header moves forward.

With pickup reels as well, the fingers often spear the sunflower seed heads and carry them around as the reel rotates. It is known to mount a cover over the fingers to make a flat surface instead of spaced apart fingers to facilitate harvesting sunflowers.

Various reels with unconventional configurations have been developed for harvesting sunflowers. For example U.S. Pat. No. 4,445,314 to Gust discloses a reel with two curved opposite faces where the rotational axis is at a mid-point of the faces and the outer edges are rounded. With the entire reel smooth and rounded in this manner, when it rotates to urge sunflower stalks into the combine there is nowhere for the stalks to hang. Similarly U.S. Pat. No. 4,589,250 to Faul, Jr. discloses a tubular reel with short fingers extending from the tube, and U.S. Pat. No. 4,255,920 to Janzen discloses a reel with three solid smooth faced blades, again leaving nowhere for the stalks and hanging heads to hang.

Significant costs and time are required to remove the conventional fixed blade or pick-up reel, which is still required for many crops, and replace it with a reel more suited to harvesting sunflowers.

SUMMARY OF THE INVENTION

The present disclosure provides a plant pushing apparatus for a combine header reel that overcomes problems in the prior art.

The present disclosure provides an apparatus for mounting on a reel of a combine header mounted on a front end of a combine for travel in a forward operating travel direction to cut plant stalks, wherein the reel comprises a center shaft rotatably mounted at each end thereof to the combine header, a plurality of contact members mounted to the center shaft in a horizontal orientation radially spaced from the center shaft, and a drive operative to rotate the center shaft such that the contact members below the center shaft move in a rearward direction toward the combine header. The apparatus comprises, for each contact member, a projecting shield member adapted at an inner portion thereof for attachment to the contact member such that an outer edge of the projecting shield member is substantially horizontal and rearward of the contact member, and such that the outer edge of the projecting shield member contacts plant stalks and pushes the plant stalks toward the combine header ahead of the following attached contact member.

The apparatus attaches to a conventional pickup or fixed blade reel to facilitate cutting sunflower plants. The outer edge of the projecting shield member pushing against the bent stalk of a sunflower plant reduces the occurrence of cut sunflower stalks hanging on the contact member of the reel with the head of the sunflower on one side and the stalk on the other.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic side view of an embodiment of the plant pushing apparatus of the present disclosure mounted on the reel of a combine header;

FIG. 2 is a schematic side of the plant pushing apparatus of FIG. 1 where the reel is a fixed blade conventional reel;

FIG. 3 is a schematic side view of the projecting shield member of the embodiment of FIG. 1 contacting a sunflower plant;

FIG. 4 is a schematic side view of a contact member of a reel of the prior art contacting a sunflower plant;

FIG. 5 is a schematic sectional side view of the embodiment of FIG. 1 mounted on the finger tube of a pickup reel and covering the fingers thereof;

FIG. 6 is a schematic sectional side view of the embodiment of FIG. 1 mounted on the fixed blade of a conventional reel;

FIG. 7 is a schematic side view of an alternate embodiment of the plant pushing apparatus of the present disclosure mounted directly to the fixed blade of a conventional reel;

DETAILED DESCRIPTION OF THE ILLUSTRATED EMBODIMENTS

Figure 8:
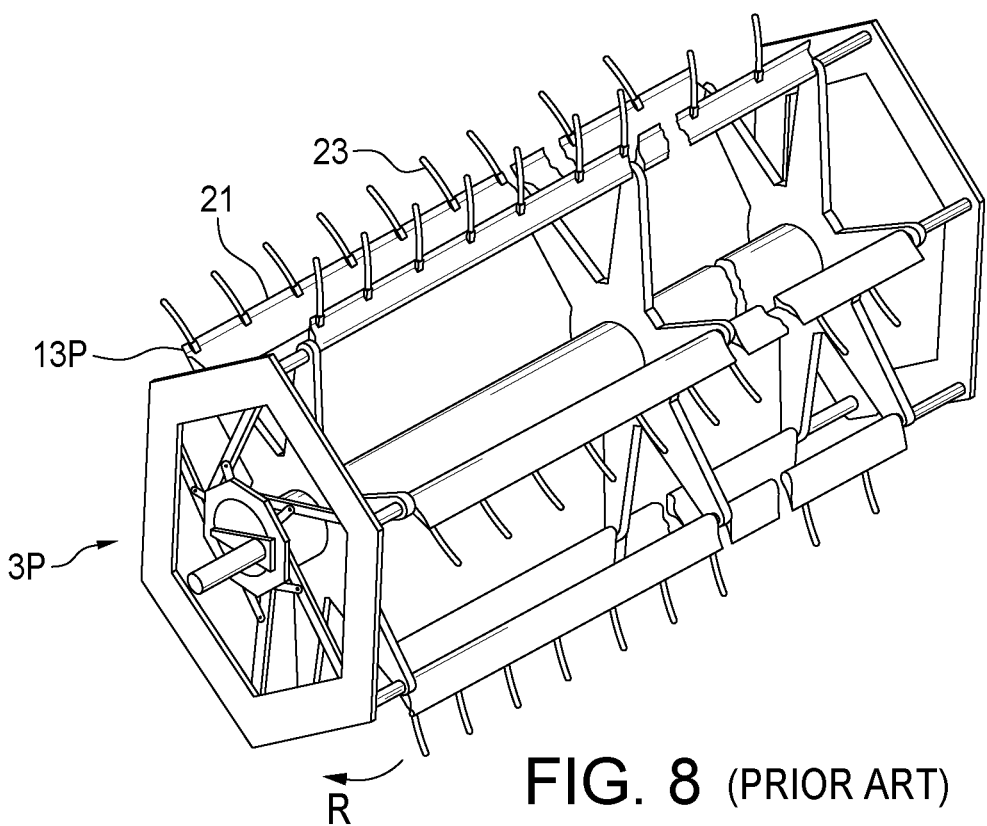
FIG. 8 is a perspective view of a pickup reel of the prior art.

FIGS. 1-3 schematically illustrate an embodiment of a plant pushing apparatus 1 of the present disclosure for mounting on a reel 3 of a combine header 5 mounted on a front end of a combine 7 for travel in a forward operating travel direction T to cut plant stalks, and in particular to cut sunflower plants 9. As schematically illustrated in FIG. 2 the reel 3 comprises a center shaft 11 rotatably mounted at each end thereof to the combine header 5. FIG. 2 schematically illustrates a fixed blade reel 3 with fixed blade contact members 13 mounted to the shaft 11 in a horizontal orientation radially spaced from the shaft 11, and a drive 15 operative to rotate the shaft 11 such that the contact members 13 below the shaft move in a rearward direction R toward the combine header 5.

As schematically illustrated in FIG. 3, the apparatus 1 comprises, for each contact member 13, a projecting shield member 17 adapted at an inner portion 17A thereof for attachment to the contact member 13 such that an outer edge 17B of the projecting shield member 17 is substantially horizontal and rearward of the contact member 13. With this arrangement the outer edge 17B of the projecting shield member 17 contacts the sunflower plants 9 and pushes the plants 9 toward the combine header 5 ahead of the following attached contact member 13.

FIG. 4 schematically illustrates a fixed blade contact member 13' of the prior art contacting a sunflower plant 9 that includes a stalk 9A, hanging head 9B, and hook 9C formed in the stalk 9A. This is a typical sunflower plant when the yield of the crop is fairly high and the head 9B is heavy with seeds. It can be seen that the head 9B passes over the top of the contact member 13' and as the contact member 13' moves rearward in direction R the stalk 9A is cut by the knife 19 on the header 5, but with the head 9B hanging on a side of the contact member 13' opposite the cut off stalk 9A, the cut off sunflower plant 9 often hangs on the contact member 13' as it moves along its circular path, rotating on the hook 9C about the contact member 13' as the orientation changes.

As seen in FIG. 3 the outer edge 17B of the projecting shield member 17 is ahead of the contact member 13 and pushes the stalk 9A into the knife 19 so that when the stalk is cut the head 9B is still on the same side of the contact member 13 as the stalk 9A and the head and stalk fall onto the header 5. The projecting shield member 17 reduces the occurrence of the head 9B passing over the top of the contact member 13 and the hook 9C hanging on the contact member 13.

Figure 9:
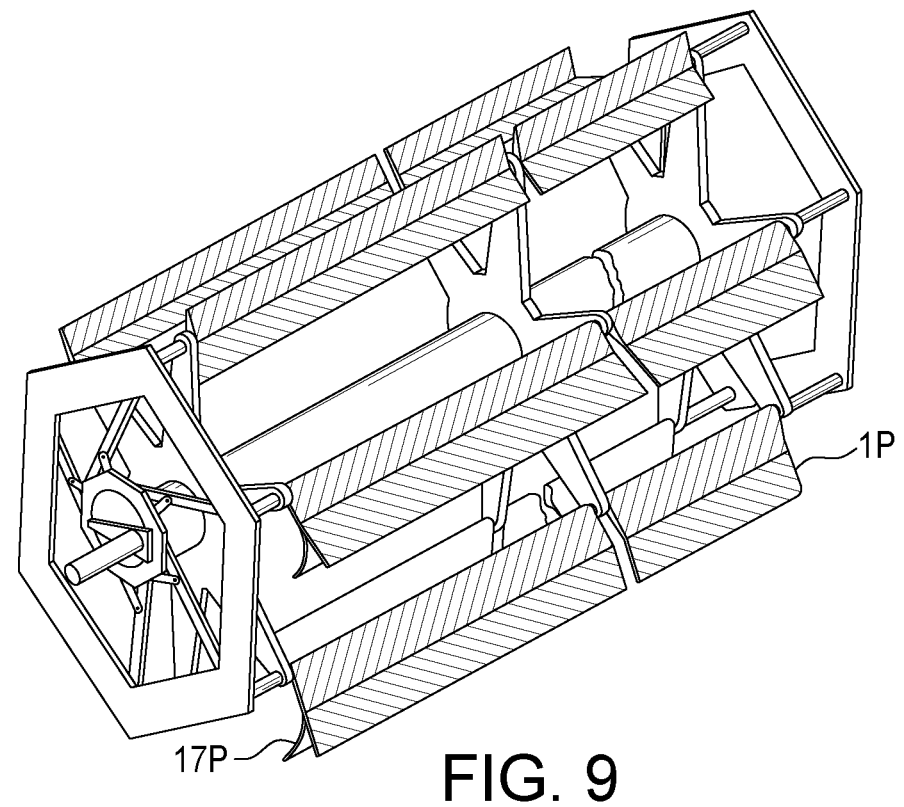
FIG. 9 is a perspective view of the embodiment of FIG. 1, as further schematically illustrated in FIG. 5, mounted on the pickup reel of FIG. 8.

FIGS. 5 and 9 schematically illustrate an apparatus 1 of the present disclosure mounted on a pickup reel 3P, such as is schematically illustrated in FIG. 8, where the contact member 13P comprises a horizontal finger tube 21 with fingers 23 pivotally mounted to the tubes 21. The tubes 21 and fingers 23 move in the rearward direction R toward the header table. The apparatus 1 comprises a cover 25 configured to attach to the finger tube 21 and cover a rear side 23R of the fingers, and wherein the projecting shield member 17 is adapted at the inner portion 17A thereof for attachment to the contact member 13P by attachment to the cover 25.

The illustrated cover 25 comprises a sheet assembly comprising a rear sheet 25R covering at least a portion of the rear side 23R of the fingers 23 and a front side 25F covering a portion of a front side 23F of the fingers 25. The front and rear sheets 25F, 25R are formed by folding a single sheet of material, such as a polyvinyl chloride material, over the finger tube 21 and the sheet assembly is then fastened to the finger tube 25 by fasteners 27 extending between the fingers 23 through corresponding holes 29 in the front and rear sheets 25F, 25R. The projecting shield member 17 is adapted at the inner portion 17A thereof for attachment to the contact member 13, comprising the finger tube 21 and fingers 23, by attachment to the cover 25, such as by rivets 31 extending through the inner portion 17A of the projecting shield member 17 and the rear sheet 25R. A brace 33 may be provided to brace the projecting shield member 17 in the desired orientation.

In the illustrated cover 25 the rear sheet 25R extends radially from the finger tube 21 beyond ends of the fingers 23, and the front sheet 25F extends radially from the finger tube 21 to a middle portion of the fingers 23, since the front sheet is only required to provide a surface for holding the fasteners 27, and does not contact the plants 9.

The outer edge 17B of the projecting shield member 17 is rounded with a radius greater than about 0.0625 inches so that same will push the stalk 9B and not cut into the stalk.

FIG. 6 schematically illustrates the same apparatus 1 mounted on a fixed blade reel where the contact member 13 is a fixed blade 35 and wherein the projecting shield member 17 is adapted for attachment to the fixed blade 35 by fasteners 27 extending through corresponding holes 29 in the front and rear sheets 25F, 25R and through the contact member.

In the illustrated apparatus 1 the outer edge 17B of the projecting shield member 17 is somewhat radially inward from an outer edge of the contact member 13, 13P, and the projecting shield member 17 curves from the inner portion 17A thereof attachable to the contact member 13, to the outer edge 17B. It is contemplated that this arrangement will pass the material smoothly along the face of the projecting shield member 17, and allow the outer edge of the contact member 13 to also contact the stalk 9A during rotation, after the projecting shield member 17 passes, to push the stalk and attached head 9B onto the header 5.

The average diameter of a sunflower head 9B is about eight inches and it is contemplated that when attached to the contact member 13, locating the outer edge 17B of the projecting shield member 17 rearward of the attached contact member 13 a distance D, as schematically illustrated in FIG. 6, that is greater than about eight inches, or greater than the average diameter of the sunflower heads 9B, will satisfactorily reduce the occurrence of the hooks 9C of the plants 9 hanging on the contact members 13.

FIG. 7 schematically illustrates an alternate apparatus 101 mounted on a reel where the contact member 113 is a fixed blade 135 and wherein the projecting shield member 117 is adapted for attachment to the fixed blade 135 by fasteners 127 extending through corresponding holes 129 in the inner portion 117B of the projecting shield member 117 and through the fixed blade 135.

Figure 10:
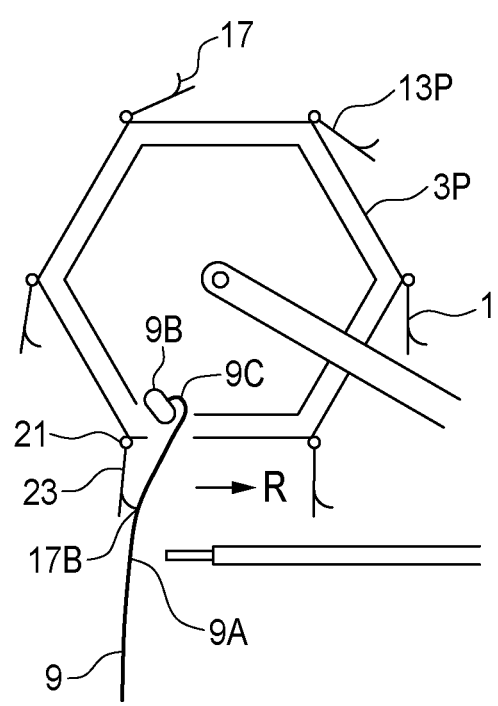
FIG. 10 is a schematic side view of the pickup reel and plant pushing apparatus of FIG. 9.

FIG. 10 schematically illustrates a side view of a pickup reel 3P with the plant pushing apparatus 1 attached to the contact members 13P. In a fixed blade reel 3 such as illustrated in FIGS. 2 and 3 the blade contact members 13 are at all times oriented radially with respect to the rotational center of the reel. In a pickup reel 3P such as illustrated in FIG. 10 the orientation of the fingers 23 changes as the reel rotates so that at the bottom of the circle of rotation the fingers 23 are oriented more upright. This upright orientation moves the outer edge 17B of the projecting shield member 17 farther rearward of the tube 21 compared to the fixed blade reel shown in FIG. 3, such that the stalk 9A is pushed farther away from the tube 21 and the incidence of the head 9B and hook 9C of the sunflower plants 9 hanging on the tube 21 is further reduced.

The disclosed apparatus 1, 101 with the projecting shield member 17, 117 reduces the occurrence of the sunflower heads 9B passing over the top of the contact members 13, 13P, 113 with the head 9B on one side of the contact member 13, 113 and the stalk 9A on the other, and the hook 9C hanging on the contact members 13, 113.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A plant pushing apparatus for mounting on a reel of a combine header mounted on a front end of a combine for travel in a forward operating travel direction to cut plant stalks, wherein the reel comprises a center shaft rotatably mounted at each end thereof to the combine header, a plurality of contact members mounted to the center shaft in a horizontal orientation radially spaced from the center shaft and extending substantially across a width of the combine header, and a drive operative to rotate the center shaft such that the contact members below the center shaft move in a rearward direction toward the combine header, the apparatus comprising:

for each of said contact members, a projecting shield of substantially equal length adapted at an inner portion thereof for attachment to the contact member such that an outer edge of the projecting shield member is substantially horizontal and rearward of the contact member, and such that the outer edge of the projecting shield member contacts plant stalks and pushes the plant stalks toward the combine header ahead of a following attached contact member.

2. The apparatus of claim 1 wherein when attached to the contact member the outer edge of the projecting shield member is radially inward from an outer edge of the contact member.

3. The apparatus of claim 1 wherein, when attached to the contact member, the outer edge of the projecting shield member is located rearward of the attached contact member a distance that is greater than about eight inches.

4. The apparatus of claim 1 wherein the projecting shield member curves from the inner portion thereof, where the projecting shield member is attachable to the contact member, to the outer edge.

5. The apparatus of claim 1 wherein the outer edge is rounded with a radius greater than about 0.0625 inches.

6. The apparatus of claim 1 wherein the contact member is a fixed blade and wherein the projecting shield member is adapted for attachment to the fixed blade by fasteners extending through corresponding holes in the inner portion of the projecting shield member and the contact member.

7. The apparatus of claim 1 wherein the contact member comprises a horizontal finger tube with fingers pivotally mounted to the finger tube, and wherein the apparatus comprises a cover configured to attach to the finger tube and cover a rear side of the fingers, and wherein the projecting shield member is adapted at the inner portion thereof for attachment to the contact member by attachment to the cover.

8. The apparatus of claim 7 wherein the cover comprises a sheet assembly comprising a rear sheet covering at least a portion of the rear side of the fingers and a front sheet covering a portion of a front side of the fingers, the sheet assembly fastened to the finger tube by fasteners extending between the fingers through corresponding holes in the front and rear sheets, and wherein the projecting shield member is adapted at the inner portion thereof for attachment to the contact member by attachment to the cover.

9. The apparatus of claim 8 wherein the front and rear sheets are formed by folding a piece of material over the finger tube.

10. The apparatus of claim 8 wherein the rear sheet extends radially from the finger tube beyond ends of the fingers, and the front sheet extends radially from the finger tube to a middle portion of the fingers.

* * * * *